(12) United States Patent
Weiler et al.

(10) Patent No.: US 10,272,881 B2
(45) Date of Patent: Apr. 30, 2019

(54) WINDSCREEN WIPER DEVICE FOR A VEHICLE

(71) Applicant: Robert Bosch GmbH, Stuttgart (DE)

(72) Inventors: Michael Weiler, Buehl (DE); Florian Hauser, Achern (DE); Peter Deak, Budapest (HU); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 14/905,911

(22) PCT Filed: Nov. 14, 2013

(86) PCT No.: PCT/EP2013/073821
§ 371 (c)(1),
(2) Date: Jan. 18, 2016

(87) PCT Pub. No.: WO2015/007350
PCT Pub. Date: Jan. 22, 2015

(65) Prior Publication Data
US 2016/0159322 A1    Jun. 9, 2016

(30) Foreign Application Priority Data
Jul. 17, 2013 (DE) .................. 10 2013 214 064

(51) Int. Cl.
*B60S 1/38* (2006.01)
*B60S 1/34* (2006.01)
(Continued)

(52) U.S. Cl.
CPC .............. *B60S 1/38* (2013.01); *B60S 1/3411* (2013.01); *B60S 1/3418* (2013.01);
(Continued)

(58) Field of Classification Search
CPC ............ B60S 1/3411; B60S 2001/3812; B60S 1/3801; B60S 2001/3813; B60S 2001/3815
See application file for complete search history.

(56) References Cited

U.S. PATENT DOCUMENTS 2,918,688 A    12/1959  D'Shei
3,131,414 A     5/1964  Wise
(Continued)

FOREIGN PATENT DOCUMENTS

CN    102131682 A     7/2011
DE      1918917      10/1970
(Continued)

OTHER PUBLICATIONS

International Search Report for Application No. PCT/EP2013/073821 dated Feb. 17, 2014 (English Translation, 3 pages).

*Primary Examiner* — Andrew A Horton
(74) *Attorney, Agent, or Firm* — Michael Best & Friedrich LLP

(57) ABSTRACT

The invention concerns a windscreen wiper device (2; 28, 30; 74; 78) for a vehicle, in particular a motor vehicle. The windscreen wiper device (2; 28, 30; 74; 78) comprises an elongate upper part (10) which is designed to be at least partially flexible. It further comprises an elongate lower part (12) which is designed to be at least partially flexible. Further present are a plurality of connection elements (18) for connecting the upper part (10) and the lower part (12), the connection elements (18) being disposed at spacings from each other along a longitudinal extension (8) of the windscreen wiper device (2; 28, 30; 74; 78) and secured to the lower part (12) by means of swivel joints (20; 122, 130).

23 Claims, 12 Drawing Sheets

(51) Int. Cl.
 *B60S 1/04* (2006.01)
 *B60S 1/32* (2006.01)

(52) U.S. Cl.
 CPC ........... *B60S 1/3801* (2013.01); *B60S 1/0491* (2013.01); *B60S 1/32* (2013.01); *B60S 1/381* (2013.01); *B60S 2001/3812* (2013.01); *B60S 2001/3813* (2013.01); *B60S 2001/3815* (2013.01)

(56) References Cited

U.S. PATENT DOCUMENTS 4,592,110 A 6/1986 Verton
6,301,742 B1 * 10/2001 Kota .......................... B60S 1/32
 15/250.361

FOREIGN PATENT DOCUMENTS

| EP | 0930207 | 7/1999 |
|----|---------|--------|
| FR | 1388148 | 2/1965 |
| GB | 1425568 A | 2/1976 |
| GB | 1425658 | 2/1976 |
| JP | H0542020 U | 6/1993 |

* cited by examiner

WINDSCREEN WIPER DEVICE FOR A VEHICLE

BACKGROUND OF THE INVENTION

The invention relates to a windscreen wiper device for a vehicle, in particular a motor vehicle, and furthermore to a wiper blade.

Windscreen wiper devices typically have a wiper arm or wiper lever, wherein a wiper blade is moved on the windscreen of a motor vehicle or something similar. In so doing, the wiper blade is moved between an upper turning point position and a lower turning point position. The wiper blade easily loses contact with the window pane particularly on windscreens having pronounced changes in curvature. As a result, unwiped wiping areas or fogging can occur, in particular in the case of windscreens having a pronounced curvature.

Because a wiping action has to be optimized for a plurality of parameters, such as, for example, an amount of rain on the windscreen, a possible snow load on said windscreen, the speed of the vehicle and the wind pressure on the wiper blade associated therewith, a fogging of the window pane cannot be prevented in a simple manner by adapting the pressure of the wiper arm on the windscreen. There is therefore the need to further improve windscreen wiper devices.

In order to improve windscreen wiper devices, there is a plurality of boundary conditions which should additionally be taken into account. Said boundary conditions include the effort and expense of manufacture, i.e. the manufacturing costs, the material costs as well as the properties of the windscreen wiper device, in particular the function during a variety of conditions and the durability for a plurality of conditions. In the case of windscreen wiper devices, it must be taken into account that the pressure of costs continually increases and that the vehicles could be used in a plurality of climatic conditions so that, e.g., extreme temperature values over long periods of time and/or with large fluctuations.

SUMMARY OF THE INVENTION

The aim of the present invention is to ensure a reliable, largely haze-free wiping of a windscreen of a vehicle.

According to one embodiment of the present invention, a windscreen wiper device for a vehicle, in particular a motor vehicle is proposed. The windscreen wiper device comprises an upper part, in particular an elongate upper part, which is designed to be at least partially flexible. It further comprises a lower part, in particular an elongate lower part which is designed to be at least partially flexible. A plurality of connection elements is disposed at spacings from each other along a longitudinal extension of the windscreen wiper device and is secured to the lower part by means of swivel joints.

According to a further embodiment, a method for manufacturing a windscreen wiper device, in particular a windscreen wiper device according to one of the embodiments described in the present application, is provided. The method includes the manufacture of an upper part which is designed to be at least partially flexible and comprises first joint parts, the manufacture of a lower part which is designed to be at least partially flexible and comprises first joint parts and the manufacture of a plurality of connection elements for connecting the upper part and the lower part, the connection elements each comprising second joint parts. The method includes clipping the first and the second joint parts together. As an alternative to or in addition to clipping the first and second joint parts together, the upper part and/or the lower part can be bent as a further optional modification in order to deform the respective first joint part to accommodate the second joint part.

According to a further embodiment, a method for manufacturing a windscreen wiper device, in particular a windscreen wiper device according to one of the embodiments described in the present application, is provided. The method includes the manufacture of a wiper blade which is designed as one piece and comprises an upper part which is designed to be at least partially flexible, a lower part which is designed to be at least partially flexible and a plurality of connection elements, wherein the connection elements are spaced apart from one another along a longitudinal extension of the windscreen wiper device.

Preferred embodiments and special aspects of the invention ensue from the dependent claims, the drawings and the present description.

The present invention and the embodiments thereof advantageously enable a particularly good adaptation of the windscreen wiper device to the curvature of a windscreen. This ensures a particularly good and precise wiping of the windscreen. Areas of the window pane that remain unwiped and a fogging of the pane can be largely prevented. The constructive design of the windshield wiper device according to the invention advantageously enables an exact adaptation of the windscreen wiper device to changes in curvature occurring within the windscreen. A largely uniform contact pressure on the windshield wiper device, in particular on the lower part thereof, is even achieved when the windscreen has pronounced curvatures and changes in curvature. With respect to conventional windscreen wiper devices, the windshield wiper device according to the invention does not require that the upper part and/or the lower part be previously adjusted to the curvature of the windscreen to be wiped. The adaptation to the curvature of the windscreen takes place quickly and in an uncomplicated manner and largely independently in the case of the windscreen wiper device according to the invention. One and the same windscreen wiper device can therefore be used for the sake of simplicity for a large number of vehicles.

Advantageously, the windscreen wiper device is designed such that torsional movements are possible between the connection elements and the lower part. This ensures a high degree of flexibility and adaptability of the lower part. In addition, the connection elements are likewise secured to the upper part by means of swivel joints in an advantageous embodiment of the invention. This ensures an even better adaptability of the windscreen wiper device to the windscreen to be wiped, wherein, in particular, a high contact pressure onto the windscreen and thus a particularly good cleaning and wiping effect can be achieved. In a particularly advantageous manner, the windscreen wiper device is designed such that torsional movements are likewise possible between the connection elements and the upper part. The swivel joints are advantageously designed as hinges. The windscreen wiper device according to the invention is particularly designed such that upper part and lower part are bar-shaped. It is furthermore advantageously possible for the upper part and the lower part to be at least partially resiliently flexible. According to one embodiment of the invention, the upper and lower part are designed to be movable with respect to one another. In a further embodiment, the upper part is disposed oppositely to the lower part. The connection elements are secured to interior sides of the upper and lower part which face each other. In a particularly advantageous manner, the connection elements are designed to be resistant to buckling.

According to one embodiment of the invention, the upper part and the lower part, in particular in an end region of the windscreen wiper device, are fixedly connected to one another at an outer connection position. The outer connection position is, in particular when viewed in a direction pointing from the outside to the inside in the longitudinal extension of the windscreen wiper device, configured in front of the connection elements. This configuration advantageously ensures that an especially good stability of the windscreen wiper device is achieved. In addition, a particularly high degree of flexibility and adaptability to the curvature of the windscreen can be achieved, wherein a uniform contact pressure of the lower part onto said windscreen is provided. In a further advantageous embodiment, the upper and the lower part can be connected to each other at the outer connection position in such a way that said upper and lower part form a wedge. The upper and lower part are, in particular, connected to one another at the ends thereof. According to further embodiments, one or a plurality of first connection elements and one or a plurality of second connection elements are provided as follows. A first connection element is disposed in comparison to a second connection element in such a manner that the first connection element lies relative to the second connection part in the direction of the connection position of the upper part and the lower part, i.e. in the direction of the point of the wedge or, respectively, on the outside. In this case, the first connection element is shorter than the second connection element. At least 70% or at least 50% of the connection elements can, for example, be designed in such a manner that they become shorter towards the outside, i.e. in the direction of the connection position of the upper part and the lower part.

According to further embodiments, which can be combined with other embodiments, the lower part is configured convexly in the unloaded state, i.e. comprising a curvature which, in a central region thereof, protrudes away from the upper part. The windscreen wiper device according to the embodiments described here can typically, starting with the convex form of the lower part, then assume the corresponding concave form of the lower part, which adapts to the windscreen, when contact is made with said windscreen.

According to a further embodiment, the longitudinal axes of the connection elements extend at angles to the lower part which lie between 65° and 115°, in particular between 75° and 105°. This advantageously ensures that a force acting on the lower part is transmitted particularly well to the upper part. In addition, a particularly stable windscreen wiper device can be achieved in this way. The angles lie between 80° and 100° in a particularly advantageous manner.

According to a further embodiment, the spacing between each two adjacent connection elements is less than 50 mm, in particular less than 30 mm. As a result, a particularly high degree of flexibility of the windscreen wiper device, in particular of the lower part thereof, and a good adaptation to the curvature and changes in curvature of the windscreen to be washed are ensured.

According to a further typical embodiment, the upper part is designed to comprise one or two parts. As a result, a high degree of stability of the windscreen wiper device can be achieved.

According to a further advantageous embodiment, a flexible windscreen wiper lip is fitted to one side of the lower part which faces away from the upper part. In so doing, a particularly high degree of functionality of the windscreen wiper device is provided.

According to a further embodiment, the lower part is connected to a tension generating device for generating a tensile force acting on the lower part, in particular in the direction of the longitudinal extension of the lower part. By means of this embodiment, the windscreen wiper device, in particular the lower part thereof, can be particularly precisely applied and adapted to the curvature of the windscreen. The tensile force is thereby transmitted particularly by means of the connection elements onto the upper part. The tension generating device can, for example, be implemented by means of an actuator for generating length contractions. Said device is disposed in such a way that the length contractions act on the lower part.

According to a further embodiment, the upper part is connected to a pressure generating device for generating a compressive force acting on the upper part, in particular in the direction of the longitudinal extension of the upper part. This likewise enables the windscreen wiper device to be especially precisely applied and adapted to the curvature of the windscreen. The compressive force is thereby transmitted to the lower part particularly by means of the connection elements. The pressure generating device can, for example, be implemented by means of an actuator for generating length extensions, said actuator being disposed in such a manner that the length extensions act on the upper part.

According to a further embodiment, a plurality of actuators for generating length contractions and length extensions is present and is disposed in the lower part along the longitudinal extension thereof. This enables the lower part to be precisely and evenly applied to windscreens which have a difficult curvature, i.e. in particular windscreens comprising convex and concave curvature constituent parts. The actuators are advantageously configured in such a way that they contract in a region of the windscreen having a convex curvature and expand in a region of the windscreen having a concave curvature. The actuators can be actuated particularly by a control means by means of suitable electrical signals. In addition, it is advantageously possible to measure the windscreen to be wiped in advance in order to determine convex and concave curvature locations. A model of the measured windscreen can then be deposited in the control means. It is alternatively or additionally possible for one or a plurality of sensors to be provided with which the curvature of the windscreen can be determined. The items of information provided by the sensors can be used for suitable actuation signals for the actuators.

According to a further embodiment, an interstice is formed between the upper part and lower part in which a spoiler is disposed for the purpose of influencing an airstream which penetrates the interstice. As a result, the precision in wiping the windscreen can be advantageously improved. For example, the spoiler can be designed in such a way that a wind lift can be compensated particularly at high driving speeds. The wind lift would otherwise reduce the compressive force of the windscreen wiper device. The spoiler can furthermore be designed such that a wind lift is used to push the windscreen wiper device downwards in the direction of the windscreen. The compressive force of the windscreen wiper device is increased and its especially precise conformation to the curvature of the window pane is ensured.

According to a further embodiment, at least one flexibly designed portion of the lower part is formed by means of material which has a modulus of elasticity that lies in a range between 0.005 kN/mm2 and 0.1 kN/mm2. As a result, an especially resilient and flexible lower part can be achieved.

According to a further embodiment, the windscreen wiper device according to the invention is designed in such a manner that said device is constructed according to a so-called fin ray principle. This fin ray principle is derived from the structure of fins of certain fish. According to the fin ray principle, the lower part of the windscreen wiper device, and advantageously also the upper part thereof, does not give way in the direction of a compressive force when the compressive force is exerted against the lower part, but arches in the opposite direction, i.e. in the direction from which the compressive force comes.

According to further typical embodiments, the upper part and the lower part are connected to swivel joints or, respectively, further swivel joints on the connection elements. The swivel joints on the upper part and the lower part enable a movement according to the fin ray principle and are therefore used for an especially good adaptation of the windscreen wiper device or, respectively, a wiper lip to the windscreen.

According to a further typical embodiment, the swivel joints and/or the further swivel joints for the upper part can include a first joint part and a second joint part. The first joint part can, for example, be cylindrical or spherical in shape and the second joint part can comprise an undercut for accommodating the first joint part. The two-parted design of the swivel joints provides a multiplicity of options for favorably influencing the joint properties, such as the creep behavior. Materials can be selected in such a way that reliable or durable joint properties are enabled even when a high level of temperature fluctuations occur and/or when environmental temperatures remain high for long periods of time.

According to a further typical embodiment, the swivel joints can be film hinges. The film hinges can, for example, be integrally formed with the connection element and/or the lower part. In particular, the connection element, the upper part and the lower part as well as the swivel joints can be designed as one piece. The design of the swivel joints as film hinges allows for a simple and cost effective production. In a corresponding design, the wiper blades or, respectively, the windscreen wiper devices can be provided in an off-tool manner or in a wide range of applications in an off-tool manner.

According to a further typical embodiment, the film hinges can have a thickness of 0.1 mm to 0.8 mm, in particular 0.2 to 0.4 mm. The thickness of the film hinges allows for a bending stiffness at a predetermined value or thereunder and furthermore makes possible a production using injection molding techniques when corresponding properties of the wiper blade are present, e.g. a sufficient creep resistance of the swivel joints.

According to a further typical embodiment, the film hinges can be from a material from the group consisting of POM, PA, and TPE. The material selection for the film hinges, in particular in connection with the thickness of the hinges, allows for a bending stiffness at a predetermined value or thereunder and furthermore makes possible a production using injection molding techniques when corresponding properties of the wiper blade are present, e.g. a sufficient creep resistance of the swivel joints.

According to a further typical embodiment, the first and the second joint part can be clipped to one another, or the first and the second joint part can be produced by means of a 2-component injection molding process. Clipped swivel joints offer a multiplicity of options for favorably influencing the joint properties, for example the bending stiffness and/or the creep behavior. Materials can be selected in such a way that reliable or durable joint properties are made possible even at high levels of temperature fluctuations and/or when environmental temperatures remain high for extended periods of time. In addition, reliable wiper devices can also be provided for more complex application areas. 2-component injection molding processes likewise allow for joint variants to be provided for more complex application areas. The advantage of production by means of an off-tool workpiece comprising two-piece joints is, however, offset by the limitations in the selection of materials for producing a 2-component injection-molded ball or cylinder joint.

According to a further typical embodiment, the windscreen wiper device can furthermore comprise a wiper lip provided on the lower part, wherein the wiper lip and the swivel joint are provided in such a way that they comprise at least partially the same material. Hence, higher quality materials can be used for the swivel joint and the wiper lip, which both have increased demands on the selection of material (elasticity, bending stiffness, creep resistance). Because other parts of the wiper device are provided with other materials, the manufacturing costs are nevertheless held within bounds. In addition, the windscreen wiper device can be produced in a 2-component process.

BRIEF DESCRIPTION OF THE DRAWINGS

Exemplary embodiments of the invention are depicted in the drawings and are described below in detail. In the drawings.

Identical reference signs are used below, unless otherwise noted, for identical elements and elements producing the identical effect.

DETAILED DESCRIPTION

Figure 1A:
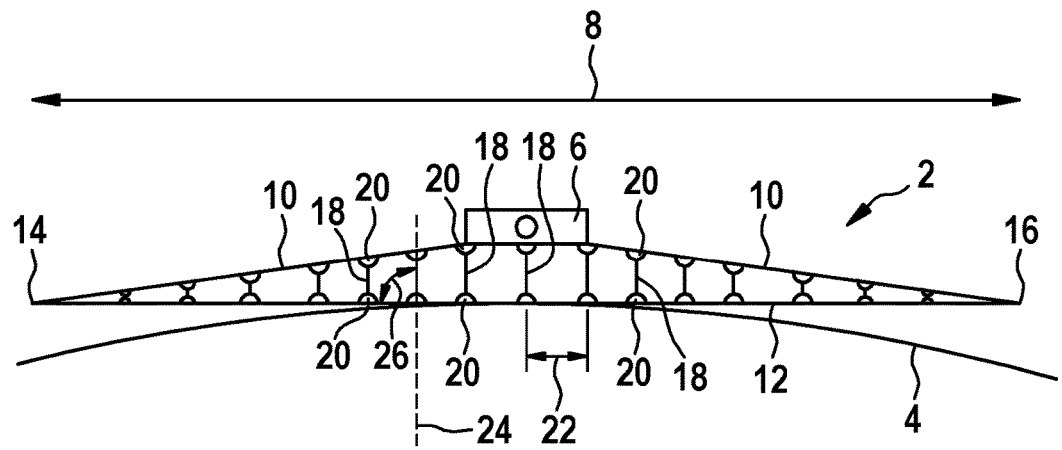
FIG. 1A shows a schematic depiction of an exemplary embodiment of a windscreen wiper device according to the invention in the form of a wiper blade in an initial position.

FIG. 1 shows a schematic depiction of an exemplary embodiment of a windscreen wiper device according to the invention. The windscreen wiper device is a wiper blade 2 in this exemplary embodiment. The wiper blade 2 is used to wipe a window pane 4 of a vehicle, which is, for example, a motor vehicle, in particular an automobile. The wiper blade 2 is typically mounted to a windscreen wiper arm which is driven by a motor in order to wipe the window pane. In addition, the wiper blade 2 has a bracket 6 with which it can be attached to the windscreen wiper arm. In FIG. 1, the wiper blade 2 is situated in an initial position, in which said blade is at least partially lifted off the windscreen 4. The wiper blade 2 has a longitudinal extension 8 and has an elongate upper part 10 and a lower part 12 which is likewise elongate. The longitudinal extensions of the upper part 10 and the lower part 12 correspond substantially to the longitudinal extension 8 of the wiper blade 2.

The upper part 10 and the lower part 12 are flexible bars or can be designed as flexible bars, which each are shown in FIG. 1 as configured in one piece. This makes for a particularly stable construction. It is also possible to in each case design only a portion of the upper part 10 and/or the lower part 12 as being flexible. In addition, it is alternatively possible for the upper part 8 to consist of two pieces, wherein then respectively one end of the two pieces of the two-pieced upper part 8 is attached to the bracket 6. According to some embodiments, which can be combined with the other embodiments described here, a material is used for the upper part 10 and/or the lower part 12 which has a modulus of elasticity which lies in a range between 0.005 kN/mm2 and 0.5 kN/mm2, in particular between 0.01 kN/mm2 and 0.1 kN/mm2. This makes a suitable flexibility of the upper part 10 and the lower part 12 possible. An optimal bending stiffness thus results from a suitably designed cross-sectional surface of the upper part 10 and the lower part 12. The upper part 10 and the lower part 12 are disposed such that they lie opposite one another. Both ends of the upper part 10 are fixedly connected at outer connection positions 14 and 16 to respectively one end of the lower part 12. The upper part 10 and the lower part 12 are otherwise spaced apart from one another.

The upper part 10 and the lower part 12 are connected to one another by means of connection elements 18. Said connection elements 18 extend approximately transversely to the longitudinal extension 8 of the wiper blade 2, in particular in the initial position of said wiper blade 2. The connection elements 18 are secured to inner longitudinal sides of the upper part 10 and lower part 12 which face each other by means of swivel joints 20. The swivel joints 20 are in this case hinges. The swivel joints 20 can particularly be designed as film hinges. This is then primarily advantageous if upper part 10, lower part 12 and/or connection elements 18 are produced from a plastic material or are coated with a suitable plastic material.

According to typical embodiments described here, which can be combined with other embodiments described here, a swivel joint is selected from the following group which consists of: a hinge, a film hinge, a tapering of the material in order to produce less stiffness along a torsional axis, a joint comprising an axis of rotation, a means for connecting the upper part to the connection element or for connecting the lower part to the connection element, which allows the lower part to move with respect to the upper part along the longitudinal extension, etc.

The connection elements 18 are disposed at spacings from each other along the longitudinal extension of the wiper blade 2. The spacings between each two adjacent connection elements 18 are identical. They can, however, also be selected so as to be different from one another. The spacings are advantageously less than 50 mm, in particular less than 30 mm. In the present exemplary embodiment, a spacing 22 is representatively selected for the spacings between each two connection elements 18. The connection elements 18 are, in particular in the initial position of the wiper blade 2, secured to the lower part 12 such that the longitudinal axes thereof extend at angles 26 to the lower part 12, which lie between 65° and 115°, in particular between 75° and 105°. In a particularly advantageous manner, the angles lie between 80° and 100°. In the present example, the same applies to the attachments of the connection elements 18 to the upper part 10. In FIG. 1A, a longitudinal axis 24 is depicted by way of example for the longitudinal axes of the connection elements 18, and an angle 26 is depicted by way of example for the angles between the connection elements 18 and the lower part 12. The distances at which the upper part 10 is spaced apart from the lower part 12 are primarily determined by the lengths of the connection elements 18. The lengths of the connection elements 18 increase starting from the two outer connection positions 14, 16 up to approximately those locations at which the bracket 6 that is mounted to the upper part 10 begins. As a result, upper part 10 and lower part 12 form a double wedge in the side view of the wiper blade 2 according to FIG. 1A, wherein the tips of the two wedges point in opposite directions. The connection elements are designed to be resistant to buckling.

Figure 1B:
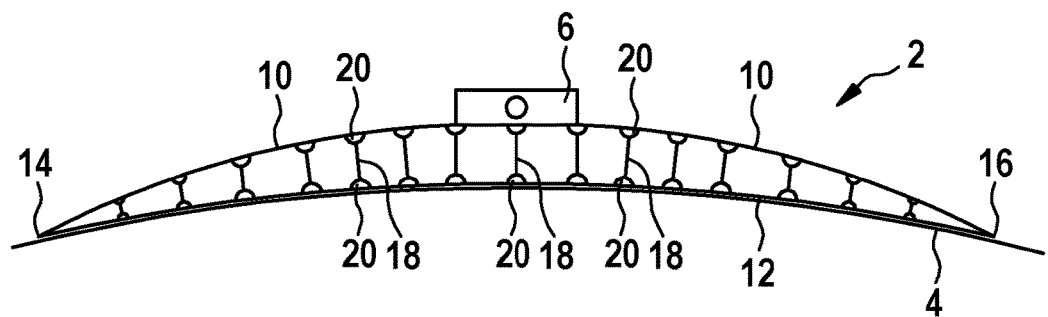
FIG. 1B shows a schematic depiction of the wiper blade according to FIG. 1A in a position where said wiper blade is applied to the windscreen.

FIG. 1B shows a schematic depiction of the wiper blade 2 according to FIG. 1A in a position where said wiper blade is applied to the windscreen 4. Because the windscreen 4 is curved, contact pressure forces act on the lower part 12 when the wiper blade 2 is applied to the windscreen 4. Because the upper part 10 and the lower part 12 are flexible bars and the connection elements 12 are rotatably mounted on the upper part 10 and the lower part 12, the upper part 10 and the lower part 12 can move relative to one another. The wiper blade 2 bends in that direction from which the compressive forces come and precisely contacts the curvature of the windscreen 4.

By means of the structure of the embodiments described here, the lower part is bent in the direction from which the force acts when a force is exerted on the lower part (by means of the windscreen). This results from the connection of the upper part 10 and the lower part at connection positions 14 and/or 16, the shape and from swivel joints at the connection between the connection elements and the upper or, respectively, lower part.

In the depiction according to FIG. 1B, the wiper blade 2 and the windscreen 4 are spaced apart from each other at a small distance, which is only used here to clarify the windscreen 4 and wiper blade 2 and which in reality is for the most part not present when the wiper blade 2 is applied to the windscreen 4. In addition, a rubber lip is situated on the lower side of the lower part 12 which faces away from the upper part 10 in the case of most wiper blades, said rubber lip not being depicted for the sake of clarity and contacting the windscreen 4 in order to wipe the same.

Such a windscreen wiper device, for example a windscreen wiper arm or a windscreen wiper arm comprising a windscreen wiper blade, has the advantage of an improved adaptation to the windscreen of a motor vehicle. In the case of a conventional windscreen wiper blade, the upper part thereof is usually rigid, i.e. it is not flexibly designed.

A windscreen wiper device according to the embodiments described here utilizes the effect of tail fins of certain fish, which do not give way in the direction of compression when lateral pressure is applied but arch in the opposite direction, i.e. in the direction from which the pressure is applied. This principle is also known as the "fin ray" principle.

FIGS. 1A and 1B show a wiper blade 2 having a longitudinal extension 8 which substantially extends between the connection positions 14 and 16. Such an arrangement is frequently used for windscreen wipers. A windscreen wiper device can, however, alternatively also have only one connection position, which, by analogy to FIGS. 1A and 1B, corresponds to a halving of the windscreen wiper device, and wherein, for example, a rotational axis is provided at a position of the bracket 6. Such an arrangement is frequently used for rear window wipers. By way of example, this is depicted inter alia in FIGS. 2A and 2B. Optional embodiments and details, as they are described in the individual embodiments, can generally be used for both variants of an arrangement of a windscreen wiper device.

Figure 2A:
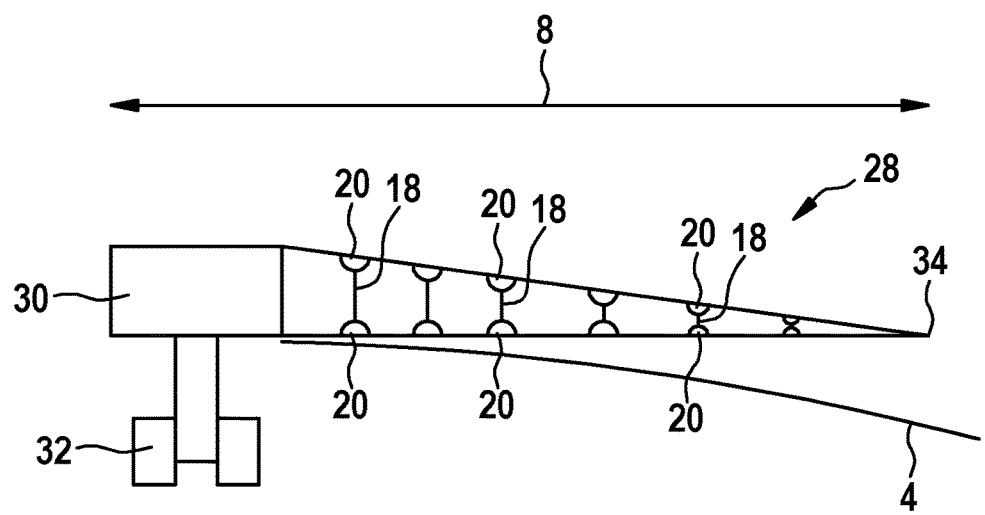
FIG. 2A shows a schematic depiction of a further exemplary embodiment of a windscreen wiper device according to the invention in the form of a wiper arm comprising an integrated wiper blade in an initial position.

FIG. 2A shows a schematic depiction of a further exemplary embodiment of the windscreen wiper device according to the invention in the initial position. The windscreen wiper device is in this case a wiper arm comprising an integrated wiper blade 28, which is mounted to a mounting part 30. The mounting part 30 is connected to a wiper motor 32 which drives the mounting part 30 to wipe the window pane 4. The wiper blade 28 is wedge-shaped, wherein one end of the upper part 10 is fixedly connected to one end of the lower part 12 at an outer connection position 34. The respectively other end of the upper part 10 and the lower part 12 are attached to the mounting part 30. With regard to the basic structure and in particular the attachments of the connection elements 18, the windscreen wiper device according to FIG. 2A corresponds in principle that of FIG. 1A.

Figure 2B:
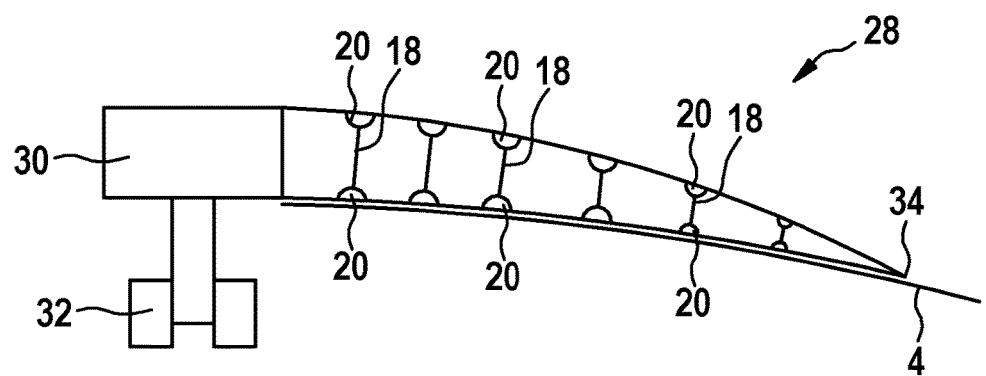
FIG. 2B shows a schematic depiction of the wiper arm comprising an integrated wiper blade according to FIG. 2A in a position where said wiper blade is applied to the windscreen.

FIG. 2B shows a schematic depiction of the wiper blade 28 comprising an integrated wiper arm 30 according to FIG. 2A in a position where said wiper blade is applied to the windscreen 4. Here too compressive forces act from below as seen from the direction of the windscreen 4 on the lower part 12 of the wiper blade 28 so that the lower part 12 and the upper part 10 bend towards the windscreen 4.

In FIG. 1A as well as in FIG. 2A, the wiper blade is depicted in the position thereof where it does not contact the windscreen in such a manner that the lower part 12 is substantially straight. According to further embodiments which can be combined with other embodiments, the lower part is convexly configured in the unloaded state, i.e. having an arch which in a central region protrudes away from the upper part. When contact is made with the windscreen, the windscreen wiper device according to the embodiments described here can, starting from the convex shape of the lower part, then typically assume the corresponding concave form of the lower part, which conforms to the windscreen.

Figure 3A:
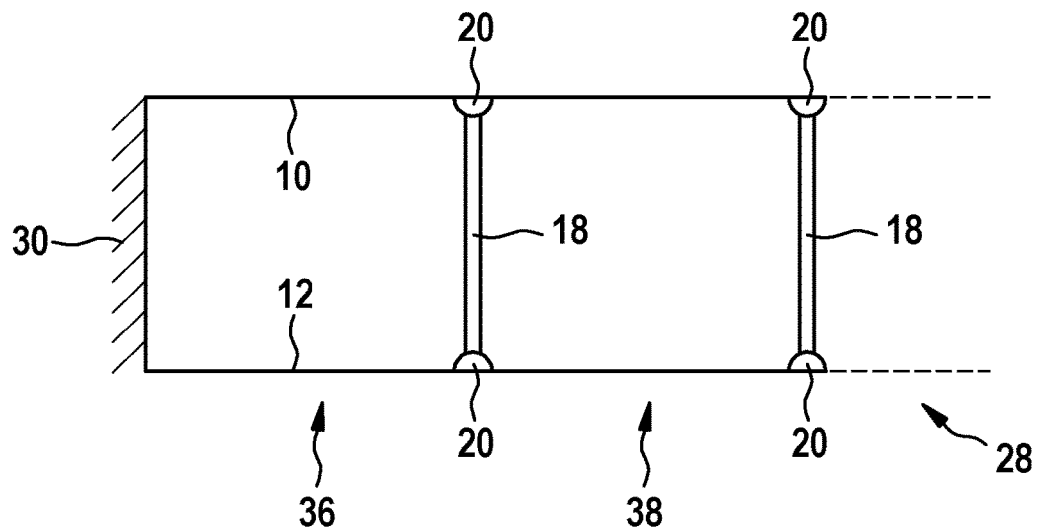
FIG. 3A shows a schematic depiction of a section of the wiper blade according to FIG. 2A.

FIG. 3A shows a schematic depiction of a section of the wiper blade 28 according to the exemplary embodiment according to FIG. 2A, in which the wiper blade 28 is situated in the initial position. The left end region of the wiper blade 28, in which an end of the upper part 10 and an end of the lower part 12 are attached to the mounting part 30, is depicted. Starting from the transition of the mounting part 30 to the wiper blade 28, FIG. 3A shows the first two connection elements 18, which delimit the two wiper blade elements 36 and 38. The connection elements 18 are secured by means of swivel joints 20 to the upper part 10 and the lower part 12.

Figure 3B:
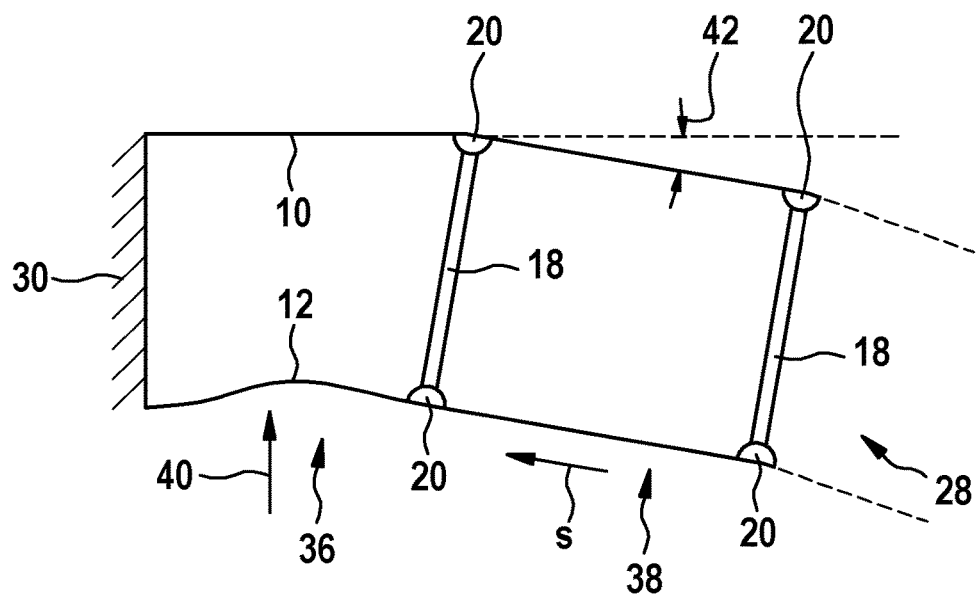
FIG. 3B shows a schematic depiction of a section of the wiper blade according to FIG. 2B.

FIG. 3B shows a schematic depiction of a section of the wiper blade 28 according to the exemplary embodiment according to FIG. 2B, in which the wiper blade 28 is applied to the windscreen 4. Compressive forces act from below from the direction of the windscreen on the lower part 12. A compressive force 40 is depicted in FIG. 3B which represents the compressive forces. The compressive force 40 causes the lower part 12 of the wiper blade element 36 to arch and bend. As a result, the swivel joint 20 of the first connection element 18 is displaced to the left by a distance s. The second wiper blade element 38 bends downwards in the direction from which the compressive force 40 comes and fits snugly against the windscreen. In so doing, an angle 42 develops between the first wiper blade element 36 and the second wiper blade element 38. In addition, a further compressive force forms, which then acts on the lower part 12 of the second wiper blade element 38 and prevents the wiper blade element 38 form bending further downwards. A chain reaction results to the wiper blade element adjacent on the right side up to the end of the wiper blade 28.

Figure 4A:
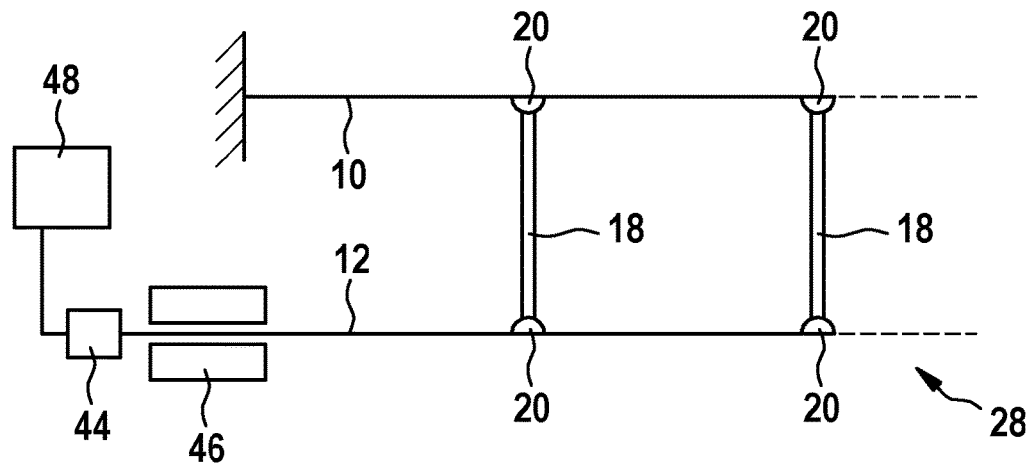
FIG. 4A shows a schematic depiction of a further exemplary embodiment of a windscreen wiper device in an initial position comprising an actuator as a tension generating device.
Figure 4B:
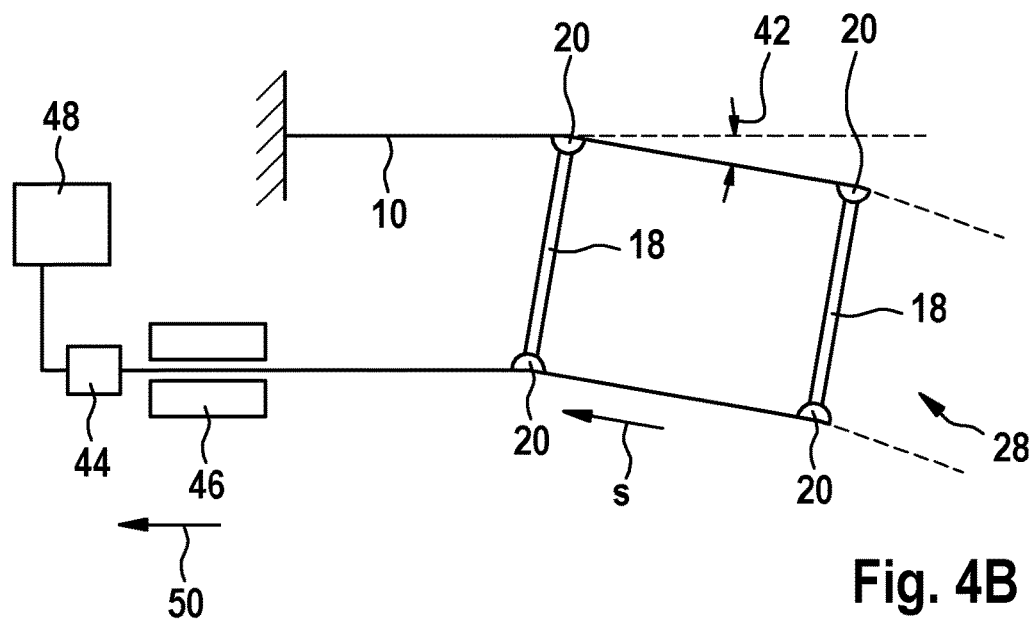
FIG. 4B shows a schematic depiction of an exemplary embodiment of a windscreen wiper device according to FIG. 4A in a position where said device is applied to the windscreen.

FIG. 4A shows a schematic depiction of a further exemplary embodiment of the windscreen wiper device comprising an actuator 44 as a tension generating device in an initial position. The actuator 44 is connected to the left end of the lower part 12 which is led through a guide 46 in the end region thereof. The actuator 44 is a piezo-actuator which can carry out length contractions. To this end, the actuator 44 is connected to a control device 48 which actuates said actuator 44 by means of suitable electrical signals. The control means 44 is designed such that it determines the suitable actuation signals for the actuator 44 on the basis of the curvature of the windscreen. During such a contraction, a tensile force 50 is exerted in the longitudinal extension 8 of the windscreen wiper device onto the lower part 12. That is depicted in FIG. 4B. The same chain reaction which was already described above in connection with FIG. 3B is in principle carried out by means of the tensile force 50.

Figure 5A:
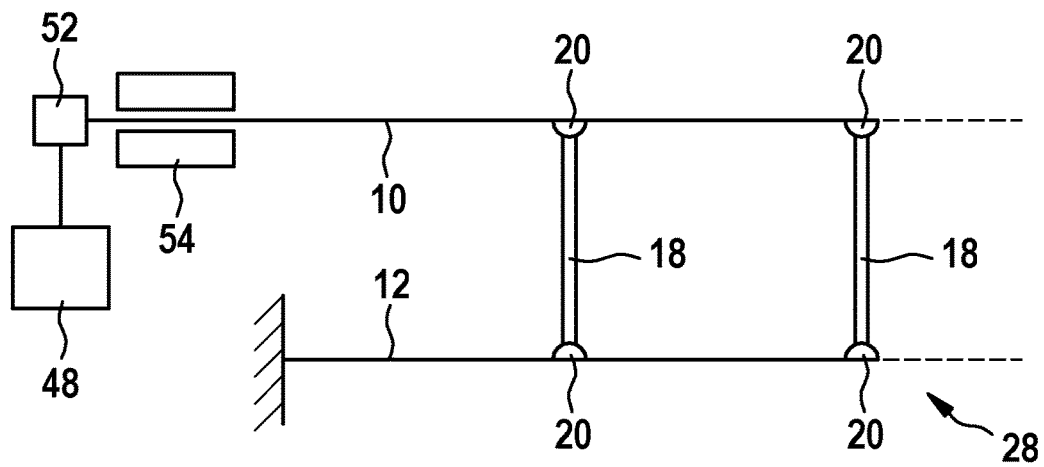
FIG. 5A shows a schematic depiction of an exemplary embodiment of a windscreen wiper device according to the invention comprising an actuator as a pressure generating device in an initial position.
Figure 5B:
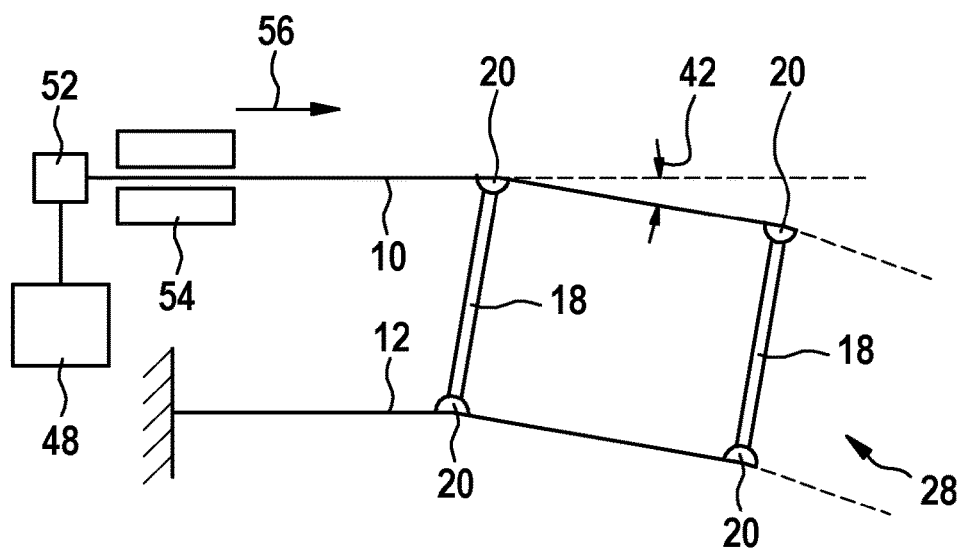
FIG. 5B shows a schematic depiction of the windscreen wiper device according to FIG. 5A where said device is applied to the windscreen.

FIG. 5A shows a schematic depiction of an exemplary embodiment of the windscreen wiper device according to the invention comprising an actuator 52 as a pressure generating device in an initial position. The actuator 52 is connected to the left end of the upper part 10 which in the end region thereof is led through a guide 54. The actuator 52 can execute length extensions. To this end, the actuator 52 is connected to the control device 48 which actuates said actuator 52 by means of suitable electrical signals. When the actuator 52 executes an extension, a compressive force 56 in the longitudinal extension 8 of the windscreen wiper device is exerted on the upper part 10. That is depicted in FIG. 5B. The upper part 10 and the lower part 12 are bent downwards in the direction of the windscreen by means of the compressive force 50. The compressive force 50 is transmitted to the lower part 12 via the connection elements 18. In principle, the same chain reaction is carried out which was already described above in connection with FIG. 3B.

Figure 6A:
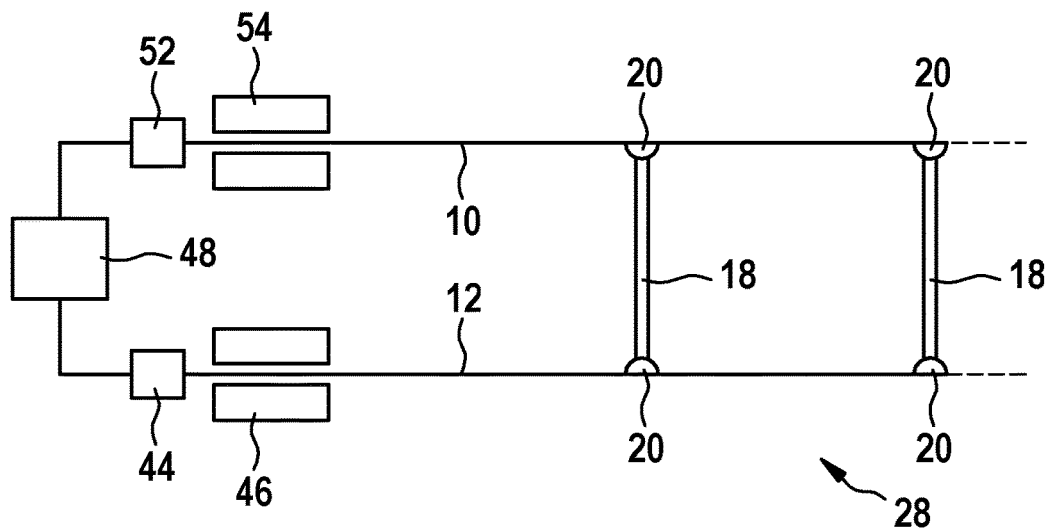
FIG. 6A shows a schematic depiction of a further exemplary embodiment of a windscreen wiper device according to the invention comprising an actuator as a tension generating device and a further actuator as a pressure generating device in an initial position.
Figure 6B:
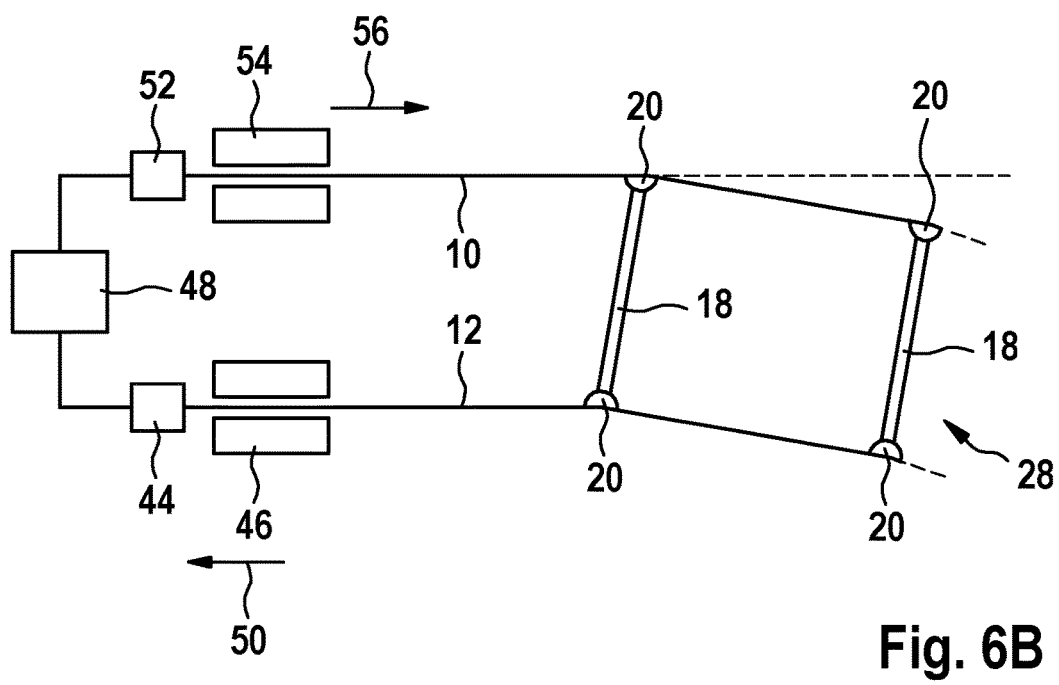
FIG. 6B shows a schematic depiction of the windscreen wiper device according to FIG. 6A where said device is applied to the windscreen.

FIGS. 6A and 6B show schematic depictions of an exemplary embodiment of the windscreen wiper device comprising the actuator 44 as a tension generating device and the actuator 50 as a pressure generating device. This exemplary embodiment constitutes a combination of the two exemplary embodiments according to FIGS. 4A, B and FIGS. 5A, B.

Figure 7A:
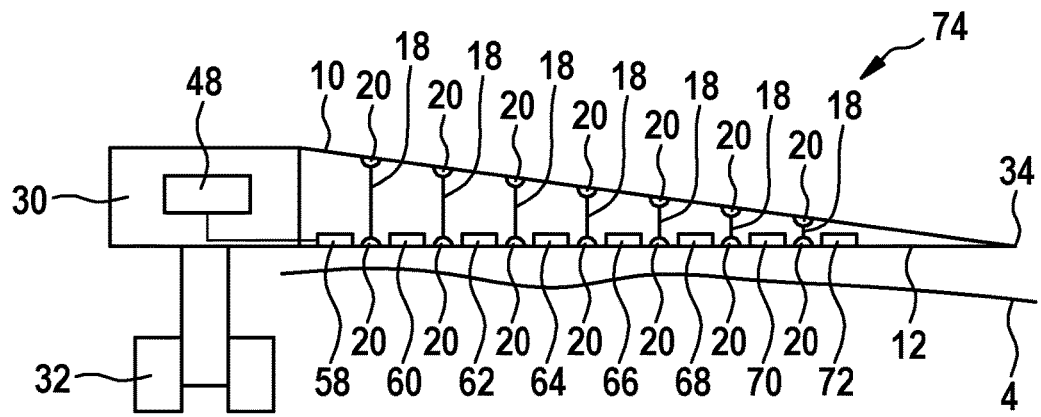
FIG. 7A shows a schematic depiction of an exemplary embodiment of a windscreen wiper device according to the invention comprising a plurality of actuators as tension and pressure generating devices in an initial position.
Figure 7B:
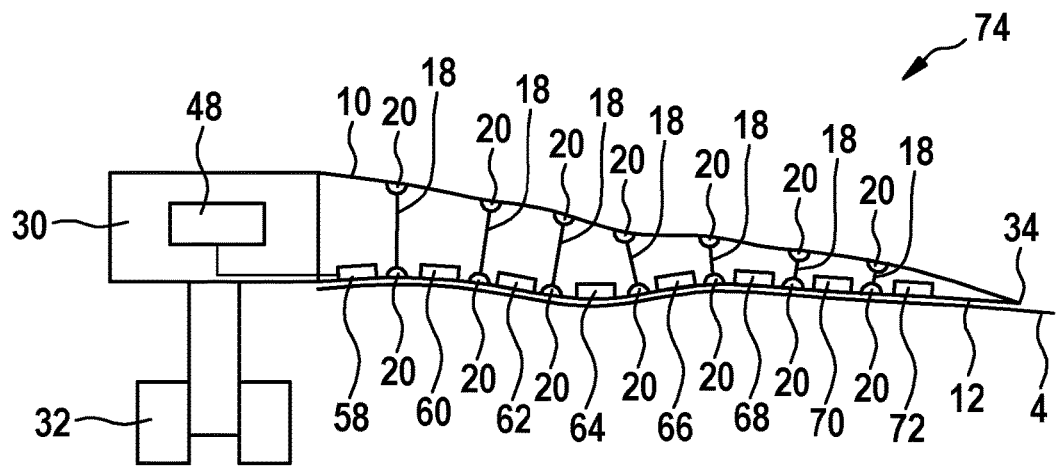
FIG. 7B shows a schematic depiction of the windscreen wiper device according to FIG. 7A where said device is applied to the windscreen.

FIGS. 7A, B show schematic depictions of an exemplary embodiment of the windscreen wiper device according to the invention comprising a plurality of actuators 58 to 72 as tension and pressure generating devices. FIG. 7A shows the windscreen wiper device in the initial position and FIG. 7B in the positon of contacting the windscreen 4. The windscreen wiper device comprises a wiper blade 74 which is connected to the mounting part 30. The actuators 58-72 are disposed in the lower part 12 along the longitudinal extension thereof and can execute length contractions or length extensions. To this end, said actuators are connected to the control device 48 which provides the actuators 58-72 with suitable actuation signals. In FIGS. 7A, B, only one connection from the control device 48 to the actuator 58 is exemplarily depicted in each case for the sake of clarity. The first actuator is disposed between the mounting part 30 and the first connection element 18 and the last actuator 72 between the last connection element 18 and the end of the wiper blade 74, i.e. the outer connection position 34. The remaining actuators 60-70 are located between adjacent connection elements 18. In this way, an actuator 58-72 is disposed in the lower part 12 of each element or subarea of the wiper blade 74. The windscreen 4 sometimes comprises constituent parts that are concavely and convexly curved in a pronounced manner. In the case of a convexly curved area, the actuators 58-72 contract and in a concavely curved area the actuators 58-72 extend. In the exemplary embodiment according to FIG. 7B, the actuator 64 has extended, whereas the remaining actuators 58-62, 66-72 have contracted.

Figure 8A:
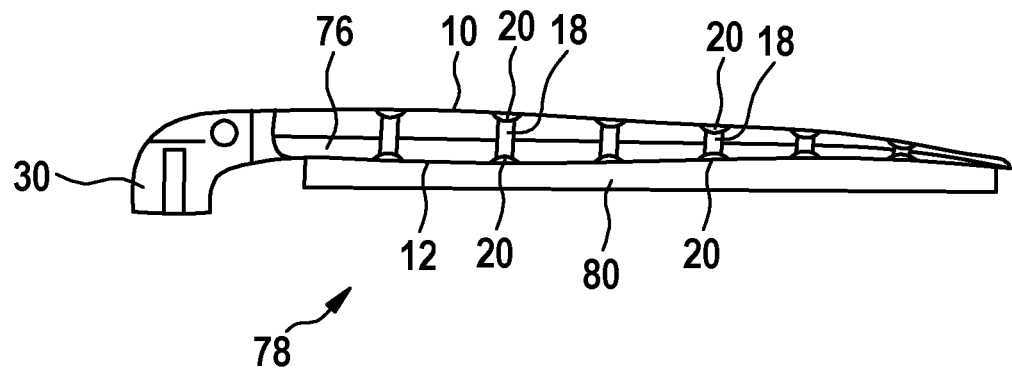
FIG. 8A shows a schematic depiction of a further exemplary embodiment of a windscreen wiper device comprising an integrated spoiler.

FIG. 8A shows a schematic depiction of an exemplary embodiment of the windscreen wiper device according to the invention comprising an integrated spoiler 76. The windscreen wiper device comprises a wiper blade 78, on the lower part 12 of which a rubber lip 80 is mounted for wiping the windscreen. The spoiler 76 is integrated into an interstice which is configured between the upper part 10 and the lower part 12. The spoiler 76 is used to influence an airstream penetrating the interstice 82. The spoiler 76 is implemented as a chamfer which is formed on the lower part 12 of the wiper blade 78. The spoiler 76 can, for example, be manufactured from rubber which is injection molded around a suitable wiper blade structure, e.g. out of sheet metal.

Figure 8B:
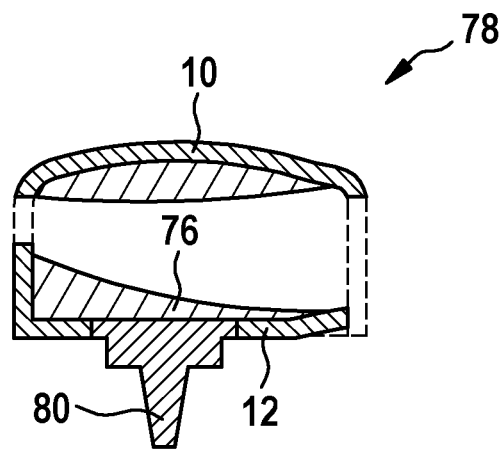
FIG. 8B shows a schematic depiction of a cross section through the windscreen wiper device according to FIG. 8A.

FIG. 8B shows a schematic depiction of a cross section through the wiper blade 78 according to FIG. 8A.

Figure 9:
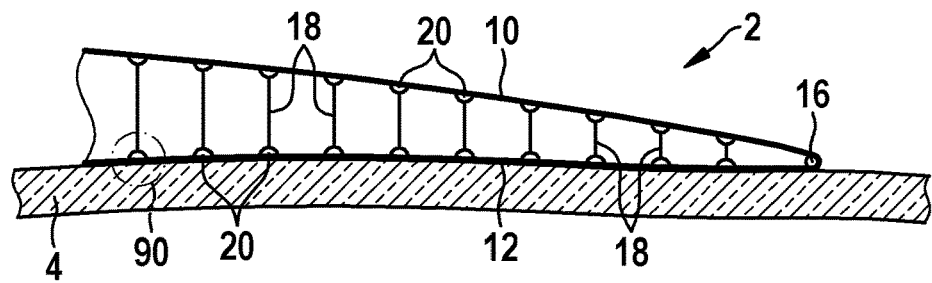
FIG. 9 shows a section of a schematic depiction of an exemplary embodiment of a windscreen wiper device according to the invention in the form of a wiper blade.

FIG. 9 shows a section of a schematic depiction of a wiper blade 2 of a windscreen wiper device. The wiper blade 2 is used to wipe a window pane 4 of a vehicle, for example a motor vehicle, in particular an automobile. According to embodiments of the present invention, the wiper blade relates to a fin ray wiper.

Connection elements 18 are disposed on an upper part 10 and a lower part 12, said connection elements being connected by means of joints 20 to the upper part and the lower part. According to typical embodiments of the present invention, a group of joints exists which is advantageously suitable for use with fin ray wipers, in particular in motor vehicles.

The following figures illustrate different variants of these joints. FIGS. 10A to 13 particularly represent a section 90 depicted in FIG. 9. The joints are designed according to typical embodiments such that a degree of freedom exists. That means that the swivel joints are typically hinges.

Figure 10A:
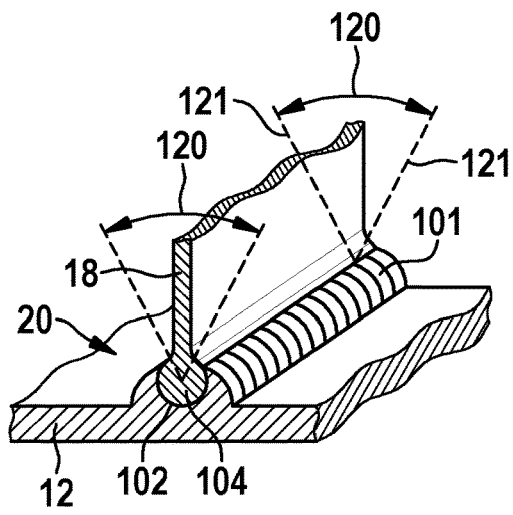
FIGS. 10A through 10D show schematic depictions of a swivel joint according to exemplary embodiments of a windscreen wiper device according to the invention in the form of a wiper blade, wherein a first joint part and a second joint part are used to configure the joint.

FIG. 10A shows a first variant of a joint according to embodiments of the present invention. It depicts the joint according to the section 90 depicted in FIG. 9. The other joints on the lower part 12 or, respectively, the upper part 10 of the wiper blade 2 can be analogously embodied. FIG. 10A shows the lower part 12 comprising a joint part 102 that is provided cylindrically, respectively as a hollow cylinder which is furnished with an undercut. The connection element 18 is designed having a corresponding joint part 104. The corresponding joint part 104 is a cylinder provided on the connection element 18 or a cylinder which is integrally formed with the connection element 18. The joint part 102, i.e. the hollow cylinder comprising the undercut, can be integrally formed with the lower part 12 of the wiper blade 2.

The joint 20 therefore leads to a mobility of the connection element 18 in the range of the angle 120. This is likewise depicted by means of the reference line 121. According to typical embodiments, the connection element 18 can extend along the axis of rotation of the cylinder 104. The swivel joint has a first joint part 102 and a second joint part 104.

Figure 10B:
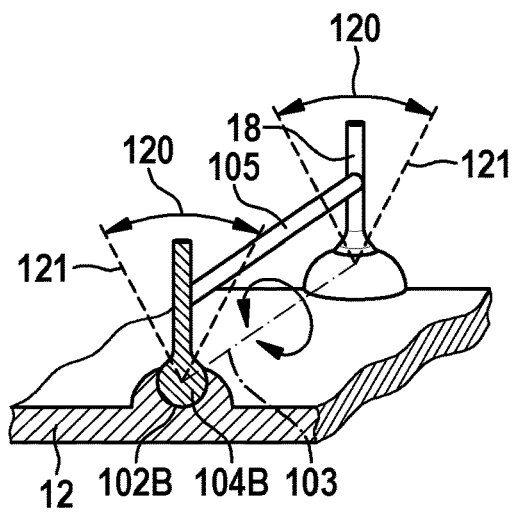

FIG. 10B shows a further joint variant according to the embodiments of the present invention. The swivel joint for the connection element or, respectively, the connection elements 18 is provided by 2 spheres 104B. The joint part 102B mounted to the lower part 12 or, respectively, the joint part 102B which is integrally formed with the lower part 12 is adapted in order to receive the joint part 104B, i.e. the sphere, with an undercut. According to typical embodiments, one or two connection elements 18 can be provided.

In the case that 2 connection elements 18 are provided, the connection elements are connected to one another to form an axis 103 by means of a transverse web 105 between said two connection elements in order to define a movement which is depicted by the angle 120 and the reference line 121. As a result, the movement can substantially be limited to one plane which corresponds to the blade plane in FIG. 9.

Figure 10C:
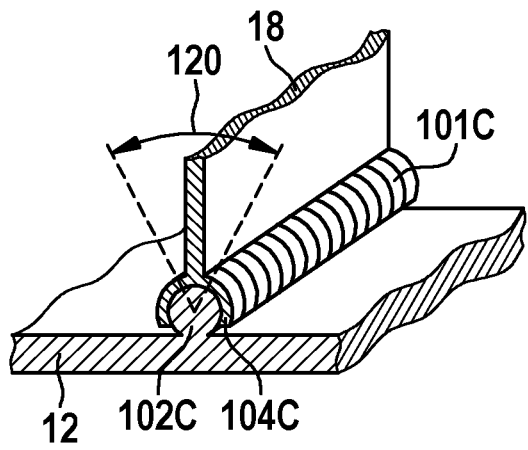

FIG. 10C shows a variant of a joint according to embodiments of the invention, wherein FIG. 10C is configured similarly to FIG. 10A. In contrast to FIG. 10A, the embodiment depicted in FIG. 10C has a joint part 102C that is designed as a cylinder and a joint part 104C that is designed as a hollow cylinder comprising an undercut. As has been already explained, the joint part 102C can be integrally formed with the lower part 12 of the wiper arm 2 or can be mounted to said lower part 12. In a similar fashion, the joint part 104C, i.e. the hollow cylinder comprising the undercut, can be integrally formed with the connection element 18 or can be mounted to the same.

Figure 10D:
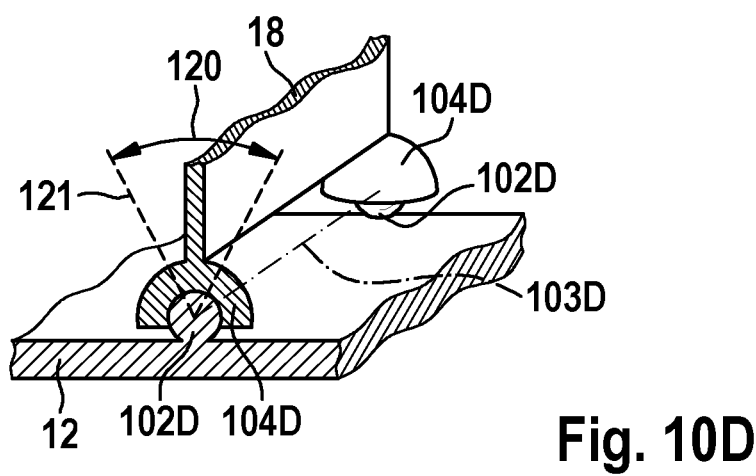

FIG. 10D is in turn analogous to FIG. 10B, wherein the joint part 102C is designed as a sphere and the joint part 104C as a hollow sphere comprising an undercut. The hollow spheres can in turn be connected to one another via an axis 103D.

In FIGS. 10A to 10D, the connection elements 18 can be clipped to the lower part 12. Finished individual parts can be used for the clipping procedure, or said clipping procedure can take place within a tool for manufacturing the workpieces when said workpieces are still warm.

Figure 14:
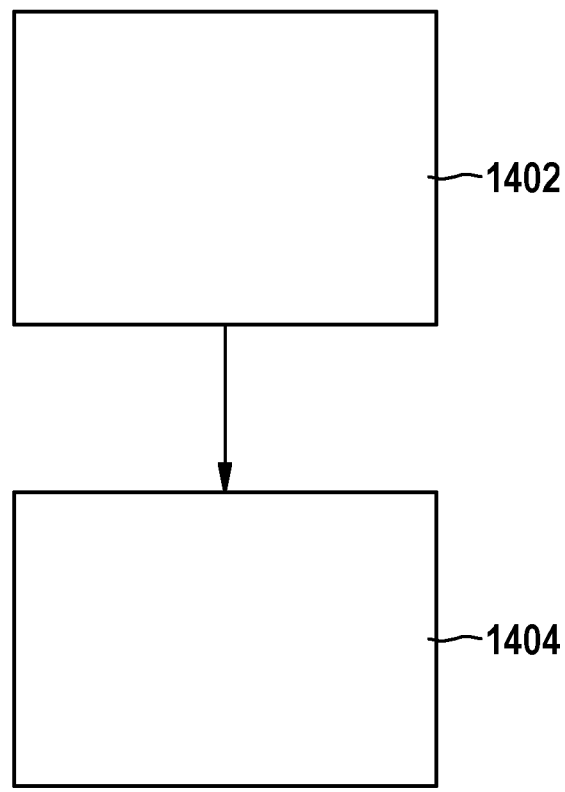
FIGS. 14 and 15 show flow diagrams to illustrate embodiments of the manufacture of windscreen wiper devices.

FIG. 14 shows schematically a flow diagram for illustrating methods for manufacturing a windscreen wiper device, for example a windscreen wiper device as it is described in connection with the FIGS. 10A to 10D. The method includes (see step 1402) the manufacturing of an upper part which is designed to be at least partially flexible and has first joint parts, the manufacturing of a lower part which is designed to be at least partially flexible and has first joint parts and the manufacturing of a plurality of connection elements for connecting the upper part and the lower part, wherein the connection elements each have second joint parts. The method includes (see step 1404) clipping the first and second joint parts together.

Figure 11:
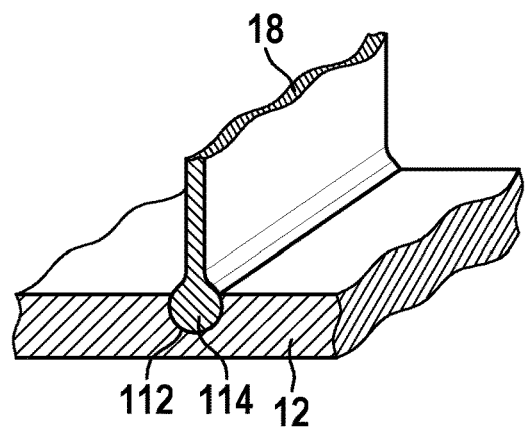
FIG. 11 shows a schematic depiction of a swivel joint according to exemplary embodiments of a windscreen wiper device according to the invention in the form of a wiper blade, wherein a first joint part and a second joint part are used to configure the joint, said first and second joint parts being produced in a 2-component injection molding process.

FIG. 11 shows a further embodiment in which a joint comprising a first joint part 112 and a second joint part 114 is provided. FIG. 11 illustrates the joint parts as cylindrical joint parts, as they are, for example, also depicted in FIG. 10A or FIG. 10C. In a similar fashion, the joint parts can, however, also be designed as spheres, analogous to FIG. 10B or FIG. 10D. According to the embodiments illustrated by means of FIG. 11, an off-tool joint is formed by one of the joint parts being injection molded from a first material which shrinks more than the surrounding shell of the other joint part. For example, the joint part 114 which is formed on the connection element 18 can be injection molded from POM, and the joint part 112 which is formed on the lower part 12 can be injection molded from PA. In so doing, a corresponding joint results when the workpiece cools down. According to embodiments of the invention, the joint can also be produced by means of a 2C-injection molding process (2-component injection molding process).

Figure 15:
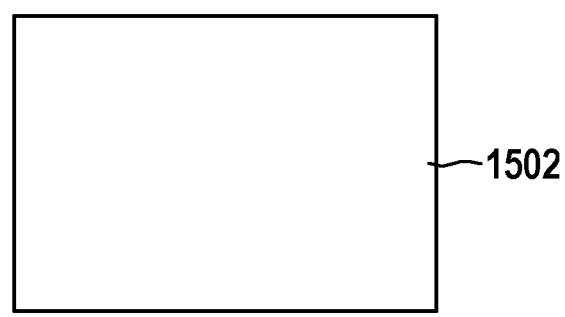

FIGS. 14 and 15 show schematically flow diagrams for illustrating methods for manufacturing a windscreen wiper device. In so doing, FIGS. 14 and 15 can also be used to illustrate a manufacturing method of a device as it is described in reference to FIG. 11. In FIG. 15, step 1502 shows a one-step method as said method is, for example, described above as a 2-component injection molding process. FIG. 14 is used to illustrate a further modification. The method includes (see step 1402) the manufacturing of an upper part which is designed to be at least partially flexible and comprises first joint parts, the manufacturing of a lower part which is designed to be at least partially flexible and comprises first joint parts and the manufacturing of a plurality of connection elements for connecting the upper part and the lower part, wherein the connection elements each comprise second joint parts. The method includes (see step 1404) bending the upper part and/or the lower part such that the openings of the hollow cylinder 112 are enlarged in the region of the undercut. The connecting elements 18 can therefore be inserted, whereupon the bending of the upper part or lower part is reduced; thus enabling the undercut to engage around the cylinder 114. In this way, a plurality of connection elements can be inserted from one end of the wiper blade to the opposite end of the wiper blade. In particular, this can be carried out with the upper part as well as with the lower part in order to bring about an assembly of the windscreen wiper device.

According to typical embodiments of the present invention which can be combined with other embodiments, the joint (see reference sign 20 in FIG. 9) or, respectively, swivel joint 20 relates to a hinge, i.e. two planes are rotatably connected to one another. In other words, a swivel joint or a bearing having a degree of freedom is provided.

In the case of the swivel joints according to FIGS. 10A to 10D, i.e. in the case of joints or hinges which are of two-piece design, a good creep behavior, e.g. a high degree of creep resistance, can particularly be provided. The materials can be selected in such a way that no permanent deformation of the joints exists in particular at high temperatures. As a result, an improved longevity of the wiper blade 2 can be provided. In particular for two-piece joints which cannot be produced by means of a 2-component injection molding process, the cylinder or the sphere, respectively the hollow cylinder or the hollow sphere, can be manufactured from the same material, said cylinder or sphere, respectively hollow cylinder or hollow sphere, comprising in each case an undercut. Temperature fluctuations thus impair the functioning of the joint to a very limited extent.

Although the two-piece embodiment of the joint may involve slightly increased manufacturing costs (the joints have to be clipped on), this can constitute an advantageous embodiment in particular for more complex areas of application or applications requiring higher demands. For example, higher demands are placed on windscreen wipers in contrast to rear window wipers.

Although the FIGS. 10A to 11 each show only a section of the lower part 12 comprising a corresponding joint 20, a corresponding joint is likewise provided at other positions of the under part 12 as well as at other positions of the upper part 10 according to embodiments of wiper blades. According to still further embodiments, which can be combined with other embodiments, a plurality of the joint variants described in this disclosure can be provided together for arrangement on a wiper blade. A joint according to one embodiment can, for example, be used in a first region of the longitudinal extension of the wiper blade, while a joint according to another embodiment is used in a second region of the longitudinal extension of the wiper blade.

Figure 12:
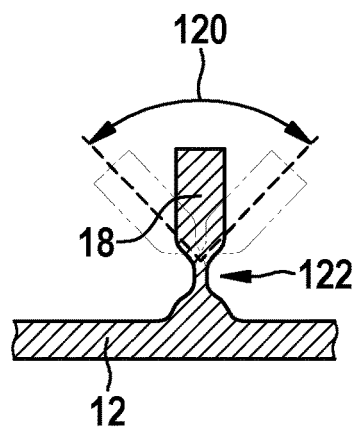
FIG. 12 shows a schematic depiction of a swivel joint according to exemplary embodiments of a windscreen wiper device according to the invention in the form of a wiper blade, wherein a film hinge is used.

FIG. 12 shows a further embodiment of a joint 20. A film hinge 122 is provided between the lower part 12 and the connection element 18. As a result, a movement can be provided with a degree of freedom as said movement is depicted by the angle 120. According to typical embodiments which can be combined with other embodiments, the wiper blade can be designed as a single piece comprising the components: lower part 12, upper part 10, connection elements 18 and a plurality of hinges or, respectively, joints 20. All joints 20 can, for example, be integrally formed with the lower part 12 and the upper part 10. This can, for example, result by means of an injection molding process.

Embodiments in which the joint is provided by a film hinge thus provide a very simple way of providing joints for a fin ray wiper. The wiper blade 2 can be provided as a single piece, in particular in an off-tool manner. According to typical embodiments, the film hinges have a high degree of flexibility. This can, for example, be provided by a material selected from the group PP, PE, POM and PA.

Embodiments of the present invention have in the joint or, respectively, hinge a bending stiffness of 75 Nmm/rad or smaller, for example 15 to 35 Nmm/rad. In the case of the joints designed as two pieces (see, for example, FIGS. 10A to 11), this can be provided in a particularly favorable manner. A suitable material selection in combination with a suitable design has to be provided for the embodiments described in connection with FIG. 12, i.e. for film hinges. It must be taken into account here that a particularly thin film hinge can lead to a permanent deformation as a result of the creep behavior of the material, said deformation impairing the function of the film hinge. At very high temperatures which are in effect over a certain period of time, the material can, for example, "flow therefrom" so that the function of the hinge permanently changes or, respectively, worsens. The film hinge must, furthermore, have a bending stiffness in a certain value range. Finally, the dimensions of the material must be configured in such a manner that a manufacturing method, such as, e.g., an injection molding process, can be favorably employed. For example, very thin regions or regions of a workpiece which are disposed behind a very thin region cannot be sufficiently filled. In this way, the dimensions of the workpiece are also limited.

According to embodiments which can be combined with other embodiments, the material from which a wiper blade comprising upper part, lower part and film hinge is provided can have a modulus of elasticity of 300 to 1600 MPa. A modulus of elasticity of 1000 MPa or lower is preferred. In the case of a smaller modulus of elasticity, it should, however, be taken into account that good creep properties, i.e. a small creep of the material, are ensured.

According to further typical embodiments which can be combined with other embodiments, a film hinge, in particular a film hinge integrally formed with the connection element 18 is provided in such a manner that the width of the connection element 18 is outside of the hinge area by 1 mm to 3 mm, for example 1.5 mm and the width in the area of the film hinge is from 0.1 mm to 0.8 mm, for example 0.3 mm.

According to further typical embodiments, a wiper lip can be provided on the lower part 12 of the wiper blade 2 depicted in FIG. 9. The wiper lip wipes across the window pane of the vehicle in order to clean the same. In the case of off-tool wiper blades, as they are described, e.g., in reference to FIG. 12, this can be provided as one piece in a preferred embodiment.

The lip can, for example, consist of the same material as the wiper blade. The lip can consist of a material, wherein a 2-component injection molding process is used; or the lip can be provided by explosion. Alternatively, a receptacle can be provided on the lower part of the wiper blade 12; thus enabling the wiper lip to be threaded into the same. This has the advantage that only the wiper lip has to be replaced when changing the wiper blade and therefore a material savings is possible.

FIG. 15 shows schematically a flow diagram for illustrating methods for manufacturing a windscreen wiper device, for example comprising a film hinge. In step 1502, a wiper blade is manufactured which is designed as one piece and comprises an upper part that is designed to be at least partially flexible, a lower part that is designed to be at least partially flexible and a plurality of connection elements, the connection elements being disposed at spacings from each other along a longitudinal extension of the windscreen wiper device. This manufacture can, for example, take place by means of an injection molding process.

Figure 13:
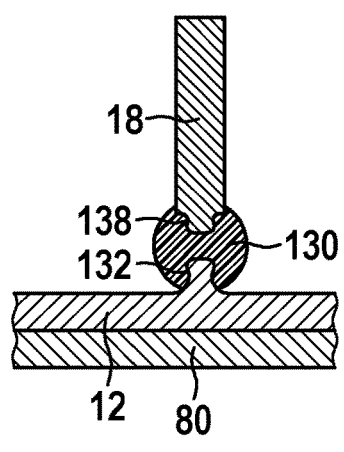
FIG. 13 shows a schematic depiction of a swivel joint according to exemplary embodiments of a windscreen wiper device according to the invention in the form of a wiper blade, wherein a swivel joint and a wiper lip comprise the same material.

A further design is shown in FIG. 13 in order to effectively and economically manufacture a wiper lip and wiper blade. In this case, the lower part 12, respectively likewise the upper part 10 for the entire wiper blade 2, and the connection elements 18 are manufactured from a first material. This can typically be the same material, or different materials can also be selected for the individual components. These materials can be selected from a group consisting of: TPE (thermoplastic elastomer), TPE-S, TPE-O, TPE-U and TPE-A, wherein materials can be used which can be favorably acquired or favorably manufactured.

The wiper lip 80 and the joint 130 can be manufactured from another material which meets the increased requirements with regard to bending stiffness, creep resistance or other requirements. Because there is only a limited material requirement for the joint and the wiper lip in such an embodiment of a joint for a wiper blade or, respectively, a wiper lip for a wiper blade, higher quality (and more expensive) materials can be used without unduly raising the total cost of the wiper blade.

A stiff or relatively stiff rib or, respectively, a stiff connection element, the lower part and the upper part can be formed from a plastic material. This plastic material can, for example, be a plastic that is reinforced with fibers. The joint 130 and the rubber profile of the wiper lip 80 are manufactured from a rubber-like material. The two different materials can, for example, be provided in a 2-component injection molding process. According to typical embodiments, a thermoplastic elastomer (TPE) can be used as the rubber-like material. Typical materials can be selected from the group consisting of: TPE (thermoplastic elastomer), TPE-S, TPE-O, TPE-U and TPE-A.

The joint 130 is connected on both sides by means of projections 132 in the lower part 12 (or upper part 10) and projections 138 in the connection elements. The joint 30, which, due to the elasticity thereof, provides a correspondingly low bending stiffness, comprises corresponding recesses, typically including undercuts, for receiving the projections. Recesses can also alternatively be located in the connection element, in the lower part or in both, wherein then corresponding projections are present in the joint.

The TPE joint can optionally be provided independently of the wiper rubber profile, i.e. of the wiper lip. Nevertheless, the rubber profile of the wiper lip and/or, for example, a styling of the surface can be produced in the same injection molding tool. The manufacturing costs can be reduced by such a reduction in the injection molding tools.

According to the embodiments described here, fin ray wipers for vehicle window panes can be manufactured in a particularly cost effective manner and/or for a majority of different application areas. Joints or, respectively, swivel joints having a suitable bending stiffness are provided which take into account the conditions of use.

What is claimed is:

1. A windscreen wiper device (2; 28, 30; 74; 78) for a vehicle, comprising
an elongate upper part (10) which is at least partially flexible,
an elongate lower part (12) which is at least partially flexible, and
a plurality of connection elements (18) connecting the upper part (10) and the lower part (12), the connection elements (18) being disposed at spacings from each other along a longitudinal extension (8) of the windscreen wiper device (2; 28, 30; 74; 78) and secured to the lower part (12) by swivel joints (20; 130; 122), wherein the swivel joints each include a first joint part (102) disposed on the lower part (12) that includes a recess having an undercut, and a second joint part (104) disposed on the connection element (18), wherein the second joint part (104) is disposed within the recess and extends into the undercut and is pivotable relative to the first joint part (102).

2. The windscreen wiper device according to claim 1, characterized in that the upper part (10) and the lower part (12), in an end region of the windscreen wiper device (2; 28, 30; 74; 78), are fixedly connected to one another at an outer connection position (14, 16; 34), wherein the outer connection position (14, 16; 34) is in front of the connection elements (18), when viewed in a direction in the longitudinal extension (8) of the windscreen wiper device (2; 28, 30; 74; 78) which points from an outside towards an inside.

3. The windscreen wiper device according to claim 1, characterized in that longitudinal axes (24) of the connection elements (18) extend at angles (26) to the lower part (12), which angles lie between between 75° and 105°.

4. The windscreen wiper device according to claim 1, characterized in that a spacing (22) between two adjacent connection elements (18) is less than 30 mm.

5. The windscreen wiper device according to claim 1, characterized in that the upper part (10) is one or two pieces.

6. The windscreen wiper device according to claim 1, characterized in that a flexible windscreen wiper lip (80) is mounted to one side of the lower part (12) which faces away from the upper part (10).

7. The windscreen wiper device according to claim 6, wherein the windscreen
wiper lip and the swivel joint comprise at least partially the same material.

8. The windscreen wiper device according to claim 1, characterized in that the lower part (12) is connected to a tension generating device (44) for generating a tensile force (50) which acts on the lower part (12) in the direction of the longitudinal extension of said lower part (12).

9. The windscreen wiper device according to claim 1, characterized in that the upper part (10) is connected to a pressure generating device (52) for generating a compressive force (56) which acts on the upper part (10), in a direction of the longitudinal extension of said upper part (10).

10. The windscreen wiper device according to claim 1, further comprising a plurality of actuators (58-72) for generating length contractions and length extensions, said actuators being disposed in the lower part (12) along the longitudinal extension thereof.

11. The windscreen wiper device according to claim 1, characterized in that an interstice (82) is formed between the upper part (10) and the lower part (12), in which interstice a spoiler (76) is disposed for influencing an airstream penetrating the interstice (82).

12. The windscreen wiper device according to claim 1, wherein the swivel joints (20; 130; 122) have a flexural strength of 75 Nmm/rad or less.

13. The windscreen wiper device according to claim 1, wherein the connection elements are secured to the upper part by further swivel joints (20; 130; 122), wherein the further swivel joints each include a first joint part disposed on the upper part that includes a recess having an undercut, and a second joint part disposed on the connection element, wherein the second joint part of each of the further swivel joints is disposed within the recess of the further swivel joint and extends into the undercut of the further swivel joint and is pivotable relative to the first joint part of the further swivel joint.

14. The windscreen wiper device according to claim 1, wherein the first and the second joint part are clipped to one another.

15. The windscreen wiper device according to claim 1, characterized in that longitudinal axes (24) of the connection elements (18) extend at angles (26) to the lower part (12), which angles lie between 75° and 105°.

16. The windscreen wiper device according to claim 1, characterized in that a spacing (22) between two adjacent connection elements (18) is less than 30 mm.

17. The windscreen wiper device according to claim 1, characterized in that the lower part (12) is connected to a tension generating device (44) for generating a tensile force (50) which acts on the lower part (12), in the direction of the longitudinal extension of said lower part (12).

18. The windscreen wiper device according to claim 1, characterized in that the upper part (10) is connected to a pressure generating device (52) for generating a compressive force (56) which acts on the upper part (10), in a direction of the longitudinal extension of said upper part (10).

19. The windscreen wiper device according to claim 1, wherein the first and the second joint part are manufactured by a two-component injection molding process.

20. The windscreen wiper device according to claim 1, wherein the first joint part (102) is a hollow cylinder that includes the recess and undercut, and wherein the second joint part (104) is a cylinder.

21. The windscreen wiper device according to claim 20, wherein the first joint part (102) is integrally formed with the lower part (12) and the second joint part (104) is integrally formed with the connection element (18).

22. The windscreen wiper device according to claim 1, wherein the recess and the second joint part (104) are each circular in cross-section.

23. A windscreen wiper device (2; 28, 30; 74; 78) for a vehicle, comprising
an elongate upper part (10) which is at least partially flexible;
an elongate lower part (12) which is at least partially flexible; and
a plurality of connection elements (18) connecting the upper part (10) and the lower part (12), the connection elements (18) being disposed at spacings from each other along a longitudinal extension (8) of the windscreen wiper device (2; 28, 30; 74; 78) and secured to the lower part (12) by swivel joints (20; 130; 122);
wherein the connection elements are secured to the upper part by further swivel joints (20; 130; 122), wherein the swivel joints and/or the further swivel joints comprise a first joint part (102; 102B; 102C, 102D, 112, 104;

104B; 104C, 104D, 114) and a second joint part (104; 104B; 104C, 104D, 114, 102; 102B; 102C, 102D, 112), and wherein the first and the second joint parts are clipped to one another.

\* \* \* \* \*